United States Patent Office 2,870,165
Patented Jan. 20, 1959

2,870,165
PROCESS FOR RECOVERING FLAVONOIDS FROM BARK

Herbert L. Hergert, Shelton, Wash., assignor to Rayonier Incorporated, Shelton, Wash., a corporation of Delaware No Drawing. Application June 20, 1956
Serial No. 592,495

8 Claims. (Cl. 260—345.2)

This invention relates to a process for recovering the flavonoids contained in bark and, more particularly, to the recovery and purification of crystalline myricetin from the flavonoid extractive of lodgepole pine bark. The invention is particularly suited to the separate recovery of myricetin from a mixture containing myricetin and other flavonoids.

The bark of certain conifers, such as Jeffrey pine (*Pinus jeffreyi*), and Douglas fir (*Pseudotsuga elliotti*) has been found to contain considerable quantities of flavonoids, the principal constituent of which is dihydroquercetin. It has now been discovered that the flavonol, myricetin (3,3',4',5,5',7-hexahydroxyflavone), can be recovered in substantial quantities from the bark of lodgepole pine (*Pinus contorta* Dougl.).

In an extensive investigation of the composition of the flavonoid fraction isolated from the bark of lodgepole pine, I have discovered that myricetin comprises approximately 2 percent by weight of the bark, and accounts for about 90 percent of the total flavonoids in the bark. The myricetin present in lodgepole pine bark seems to exist in the form of the uncombined flavonol, and may be extracted with suitable solvents along with other flavonoids in a flavonoid fraction of the bark. Upon dissolving this flavonoid fraction in a solvent, I have found that myricetin can be selectively crystallized in the presence of the remaining dissolved flavonoids. Alternatively, the flavonoid fraction can be triturated with a solvent so that the insoluble crystalline residue remaining undissolved consists of nearly pure myricetin, while the balance of the flavonoids, comprising quercetin, ampelopsin (dihydromyricetin), dihydroquercetin and traces of flavonoid impurities, are selectively dissolved and removed by the triturating solvent.

Based on these discoveries, the invention provides a process for recovering crystalline myricetin from lodgepole pine bark which comprises extracting a mixture of flavonoids from sub-divided lodgepole pine bark, dissolving the mixture of flavonoids in a solvent, and then selectively crystallizing myricetin from the solvent in the presence of the remaining dissolved flavonoids. As an advantageous alternative, the myricetin may be recovered by trituration of the flavonoid fraction with a solvent, thereby dissolving the flavonoid impurities, such as quercetin, ampelopsin and dihydroquercetin, and leaving substantially pure myricetin as a crystalline residue.

Upon removal of crystalline myricetin from the solvent, quercetin may be selectively precipitated. Thus, when the triturating solvent is acetone, dilution of the triturating solvent with water, followed by cooling, causes quercetin to selectively precipitate from the resultant solution while the water-soluble flavanones remain dissolved. Following the crystallization of quercetin, the dissolved flavanones may be precipitated by the addition of a flavanone precipitating agent, such as dibasic potassium phosphate, and recovered by acidification of the potassium salts of the flavanones. In this manner, substantially all of the flavones and flavanones may be separately recovered from the flavonoid fraction of lodgepole pine bark.

Lodgepole pine is a tree indigenous to the Pacific Northwest and most of the Rocky Mountain region of the United States. Although some authorities distinguish two varieties of this pine, one of which is limited to the coastal region (*Pinus contorta* var. Contorta), and the other to the interior (*Pinus contorta* var. *latifolia* Engelm.), there is no significant difference in the chemical nature of the extractives isolated from the bark of the several varieties. There is, however, a slight difference in the quantity of flavonoids extracted, for the bark of the coastal variety of lodgepole pine contains appreciably larger amounts of flavonoids. The following table illustrates the range in quantity of total flavonoids contained in the bark of lodgepole pine growing in several geographical areas:

TABLE I

*Flavonoid content of lodgepole pine bark*

| Geographical Area | Yield of Flavonoids (Percent by weight of dry bark) |
|---|---|
| Grays Harbor, Washington | 2.86 |
| Mt. Hood National Forest, Oreg | 0.90 |
| Ochocho National Forest, Oreg | 1.01 |

In a preferred practical embodiment of the invention, the lodgepole pine bark is air dried and reduced to a suitable state of sub-division, as in a hammer mill, to facilitate extraction. Although solvent extraction may be performed on various sizes of bark particles, the efficiency of the extraction is significantly increased if the bark has been ground to a state that will permit rapid penetration of the solvents.

To obtain the flavonoid fraction, the bark is preferably first extracted with a suitable solvent capable of dissolving not only the flavonoids but waxes and fatty material as well. Among such solvents are low-molecular weight ethers, such as ethyl ether, low-molecular weight ketones, such as acetone and methyl ethyl ketone, and low-molecular weight esters, such as ethyl acetate. The solvent extract is dried by evaporation of the solvent, leaving a mixture containing not only the flavonoid fraction of the bark, but the fatty material and waxes. Upon treatment of this extract with a defatting solvent, capable of dissolving the waxes and fatty material but not the flavonoids, only an insoluble flavonoid residue remains. By paper chromatographic fractionation of the flavonoid residue, dissolved in an acetic acid-water (60:40) solvent system, the following flavonoids were identified:

TABLE II

*Chromatographic analysis of the flavonoids of lodgepole pine bark*

| Compound | Color | $R_f$ |
|---|---|---|
| Myricetin | Yellow | 0.31 |
| Quercetin | do | 0.40 |
| Ampelopsin | Colorless, non-fluorescent | 0.65 |
| Dihydroquercetin | do | 0.72 |
| Aromadendrin | do | 0.81 |
| Pinobanksin | do | 0.87 |
| Unknown | Colorless, fluorescent | 0.70 |

The separation of fatty material and waxes from the bark extract, containing both fatty material and flavonoids, may be accomplished by a variety of defatting solvents, including aromatic hydrocarbons, such as benzene and toluene, and chlorinated hydrocarbons, such as trichlorethylene, chloroform, carbon tetrachloride and perchlorethylene.

As an advantageous alternative, the flavonoids may be extracted directly from the bark. Using this procedure, the bark is preferably first treated with a defatting solvent to extract the fatty material and waxes, and the resultant defatted bark dried. Treatment of the defatted bark with the aforementioned oxygen-containing solvents effectively extracts a mixture of flavonoids, yielding a flavonoid residue upon evaporation of the solvent.

Recovery of myricetin from the flavonoid residue, I have found, may be effected by trituration of the flavonoid residue with one of the aforementioned oxygen-containing solvents. Due to the comparative insolubility of myricetin, trituration of the flavonoid residue selectively dissolves quercetin and the remaining flavanones, leaving an insoluble yellow residue which is nearly pure myricetin. Alternatively, larger quantities of the solvent can be used to completely dissolve the flavonoid residue, and myricetin selectively crystallized by partial evaporation of the solution.

The myricetin may be further purified by recrystallization from a solvent. Upon recrystallization from warm acetone, the pure crystalline myricetin recovered contained acetone of crystallization. After prolonged drying in vacuo, the crystalline monoacetonate of myricetin, melting at 350° C. with decomposition, may be recovered.

Quercetin may be selectively precipitated and recovered from the remaining flavonoids of lodgepole pine bark. Thus, when the flavonoid residue has been triturated with a solvent to remove quercetin and the remaining flavonoids, the quercetin can be selectively removed from the solvent. Quercetin obtained in this manner is contaminated with traces of myricetin, and may be fractionally precipitated from a solvent. After separate removal of both myricetin and quercetin, the flavonoid residue contains only the water-soluble flavanones. By the addition of dibasic potassium phosphate to an aqueous solution of these flavanones, the 3-hydroxyflavanones, such as ampelopsin and dihydroquercetin, are precipitated as their potassium salts; resuspension of the potassium salts in water, followed by the addition of dilute hydrochloric acid causes the flavanones to crystallize.

In this manner, substantially all of the flavonoids contained in the bark of lodgepole pine may be readily and inexpensively recovered.

In preparing myricetin according to the practice of the invention, either stainless steel or glass-lined equipment is preferred, since the use of ordinary iron equipment causes appreciable discoloration in the final product. When the iron equipment is used, however, this discoloration in the product may be removed by recrystallizing the myricetin from acetone containing a small amount of hydrochloric acid.

The following specific examples are illustrative of the practice of the invention:

EXAMPLE I.—ISOLATION OF FLAVONES

The bark of lodgepole pine, grown in the vicinity of Grays Harbor, Washington, was peeled from several logs and ground in a hammer mill to pass a 20-mesh (Tyler standard) sieve. The ground bark was air dried, and extracted with ethyl ether in a large, borosilicate glass, Soxhlet-type extractor. The ether extract was evaporated to dryness, placed in a paper thimble and extracted with benzene in a Soxhlet extractor to remove the fatty material and waxes from the preparation. After drying, the benzene-insoluble residue (containing the flavonoids) was triturated with warm acetone and filtered. The insoluble yellow crystalline residue consisted of nearly pure myricetin, recovered in 2.0 percent yield by weight of the dry bark. The filtrate was diluted with water, and placed in an ice chest, resulting in the formation of a yellow precipitate of quercetin, recovered in 0.1 percent by weight based on the weight of the dry bark.

EXAMPLE II.—PURIFICATION OF MYRICETIN

Myricetin, obtained from Example I, was crystallized from acetone, yielding yellow crystals, M. P. 350° C. with decomposition, containing acetone of crystallization. The crystals were collected, and dried in vacuo over phosphorous pentoxide at 55° C., resulting in the crystalline monoacetonate of myricetin (Analysis: Calc'd for $C_{15}H_{10}O_8 \cdot C_3H_6O$: C, 57.44; H, 4.29. Found: C, 57.60; H, 4.87), which was chromatographically homogeneous.

Both the acetate and hexamethoxy derivates could be prepared from the crystalline monoacetonate of myricetin, and were identical with respective derivatives prepared from an authentic synthetic sample of myricetin.

EXAMPLE III.—ISOLATION OF QUERCETIN

Crude quercetin, obtained from Example I, was recrystallized several times from acetone, yielding yellow crystals melting at 310–314° C., which still contained traces of myricetin.

Conclusive proof of structure was established by preparing the penta-acetate derivative which was identical to an authentic sample of penta-acetylated quercetin in melting point, mixed melting point and infrared spectra.

EXAMPLE IV.—ISOLATION OF FLAVANONES

To the filtrate remaining after precipitation of quercetin, as in Example I, was added dibasic potassium phosphate to precipitate the potassium salts of the 3-hydroxyflavanones. The precipitate was filtered off, resuspended in a small volume of water, and acidified with dilute hydrochloric acid. Upon cooling, the acidified solution yielded colorless needles, M. P. 236–238° C., which were identified by paper chromatography as a mixture of ampelopsin (dihydromyricetin) and dihydroquercetin in a three to one ratio.

The structure of the two compounds was further verified by conversion of the mixture to the corresponding flavonols with hot 20 percent sodium bisulfite solution, which gave a mixture of yellow flavones, M. P. 308–320° C. By trituration of the flavone mixture, both myricetin and quercetin could be recovered.

I claim:

1. The process for recovering crystalline myricetin from lodgepole pine bark which comprises extracting a mixture of flavonoids including myricetin from lodgepole pine bark, dissolving the mixture of flavonoids in an oxygenated solvent of the group consisting of ethyl ether, acetone, methyl ethyl ketone, and ethyl acetate, selectively crystallizing myricetin from the solvent in the presence of the remaining dissolved flavonoids, and recovering crystalline myricetin from the solvent.

2. The process for recovering crystalline myricetin from lodgepole pine bark which comprises extracting flavonoids and fatty material from lodgepole pine bark, dissolving the fatty material of the extract in a defatting solvent of the group consisting of benzene, toluene, trichlorethylene, chloroform, carbon tetrachloride, and perchlorethylene while leaving the flavonoid content thereof as a residual solid mixture of flavonoids, dissolving the mixture of flavonoids in an oxygenated solvent of the group consisting of ethyl ether, acetone, methyl ethyl ketone, and ethyl acetate, selectively crystallizing myricetin from the oxygenated solvent in the presence of the remaining dissolved flavonoids, and recovering crystalline myricetin from the oxygenated solvent.

3. The process for recovering crystalline myricetin from lodgepole pine bark which comprises extracting fatty material from sub-divided lodgepole pine bark, extracting a mixture of flavonoids from the defatted bark, dissolving the mixture of flavonoids in an oxygenated solvent of the group consisting of ethyl ether, acetone, methyl ethyl ketone, and ethyl acetate, selectively crystallizing myricetin from the oxygenated solvent in the presence of the remaining dissolved flavonoids, and recovering crystalline myricetin from the oxygenated solvent.

4. The process for recovering crystalline myricetin from lodgepole pine bark which comprises extracting a mixture of flavonoids from sub-divided lodgepole pine bark, recovering and drying the mixture, triturating the dry mixture of flavonoids with acetone and leaving the myricetin content thereof undissolved while selectively dissolving the balance of the flavonoids in the triturating solvent, and separating and recovering crystalline myricetin from triturating solvent.

5. The process for recovering crystalline myricetin from lodgepole pine bark which comprises extracting flavonoids and fatty material from sub-divided lodgepole pine bark, dissolving the fatty material of the extract in a defatting solvent of the group consisting of benzene, toluene, trichlorethylene, chloroform, carbon tetrachloride, and perchlorethylene while leaving the flavonoid content thereof as a residual solid mixture of flavonoids, recovering and drying the mixture, triturating the dry mixture of flavonoids with acetone and leaving the myricetin content thereof undissolved while selectively dissolving the balance of the flavonoids in the triturating solvent, and separating and recovering crystalline myricetin from the triturating solvent.

6. The process for recovering crystalline myricetin from lodgepole pine bark which comprises extracting fatty material from lodgepole pine bark, extracting a mixture of flavonoids from the defatted bark, recovering and drying the mixture, triturating the dry mixture of flavonoids with acetone and leaving the myricetin content thereof undissolved while selectively dissolving the balance of the flavonoids in the triturating solvent, and separating and recovering crystalline myricetin from the triturating solvent.

7. The process for recovering crystalline myricetin from lodgepole pine bark which comprises extracting flavonoids and fatty material from sub-divided lodgepole pine bark with an oxygenated solvent of the group consisting of ethyl ether, acetone, methyl ethyl ketone, and ethyl acetate, dissolving the fatty material of the extract in a defatting solvent of the group consisting of benzene, toluene, trichlorethylene, chloroform, carbon tetrachloride, and perchlorethylene while leaving the flavonoid content thereof as a residual solid mixture of flavonoids, dissolving the mixture of flavonoids in acetone, selectively crystallizing myricetin from the acetone solution in the presence of the remaining dissolved flavonoids, and recovering crystalline myricetin from the acetone solution.

8. The process for recovering crystalline myricetin from lodgepole pine bark which comprises extracting fatty material from sub-divided lodgepole pine bark with a defatting solvent of the group consisting of benzene, toluene, trichlorethylene, chloroform, carbon tetrachloride, and perchlorethylene, extracting a mixture of flavonoids from the defatted bark with an oxygenated solvent of the group consisting of ethyl ether, acetone, methyl ethyl ketone, and ethyl acetate, dissolving the mixture of flavonoids in acetone, selectively crystallizing myricetin from the acetone solution in the presence of the remaining dissolved flavonoids, and recovering crystalline myricetin from the acetone solution.

References Cited in the file of this patent

UNITED STATES PATENTS

| | | |
|---|---|---|
| 2,534,250 | Eds et al. | Dec. 19, 1950 |
| 2,662,893 | Kurth | Dec. 15, 1953 |